United States Patent [19]
Nichols

[11] Patent Number: 4,479,507
[45] Date of Patent: Oct. 30, 1984

[54] FLUID PRESSURE OPERATED VALVE

[75] Inventor: Jimmy B. Nichols, Statesboro Township, Bulloch County, Ga.

[73] Assignee: Emerson Electric Co., St. Louis, Mo.

[21] Appl. No.: 529,217

[22] Filed: Sep. 6, 1983

Related U.S. Application Data

[62] Division of Ser. No. 278,891, Jun. 29, 1981, Pat. No. 4,418,839.

[51] Int. Cl.³ .............................................. F16K 1/12
[52] U.S. Cl. .................................... 137/220; 137/219
[58] Field of Search .................. 137/219, 220; 251/43, 251/63, 63.5

[56] References Cited

U.S. PATENT DOCUMENTS

| | | | |
|---|---|---|---|
| 2,841,359 | 7/1958 | Berck | 251/63 X |
| 3,101,924 | 8/1963 | Berck | 251/63 X |
| 3,171,432 | 3/1965 | Bard | 251/43 X |
| 3,260,275 | 7/1966 | Armstrong et al. | 137/219 |
| 3,587,622 | 6/1971 | Hardison | 137/220 |

FOREIGN PATENT DOCUMENTS

783133  8/1935  France .................................. 251/43

Primary Examiner—Gerald A. Michalsky
Attorney, Agent, or Firm—Charles E. Markham

[57] ABSTRACT

A fluid pressure operated valve device for connection to the inlet and outlet sides of a pilot valve has a two part, axially separable hollow cylindrical body with axially aligned inlet and outlet passageways, a side ported hollow cylindrical liner of smaller diameter having a closed end and an open end is fixed in the body with its open end surrounding the inlet passageway, a biased closed valve element reciprocates in the liner and controls the ports, passageway means for applying inlet pressure to the interior of the liner to close the valve element, and passageway means leading from the interior of the liner to the exterior of the valve body and from the exterior of the valve body through the valve body to the outlet passageway.

4 Claims, 3 Drawing Figures

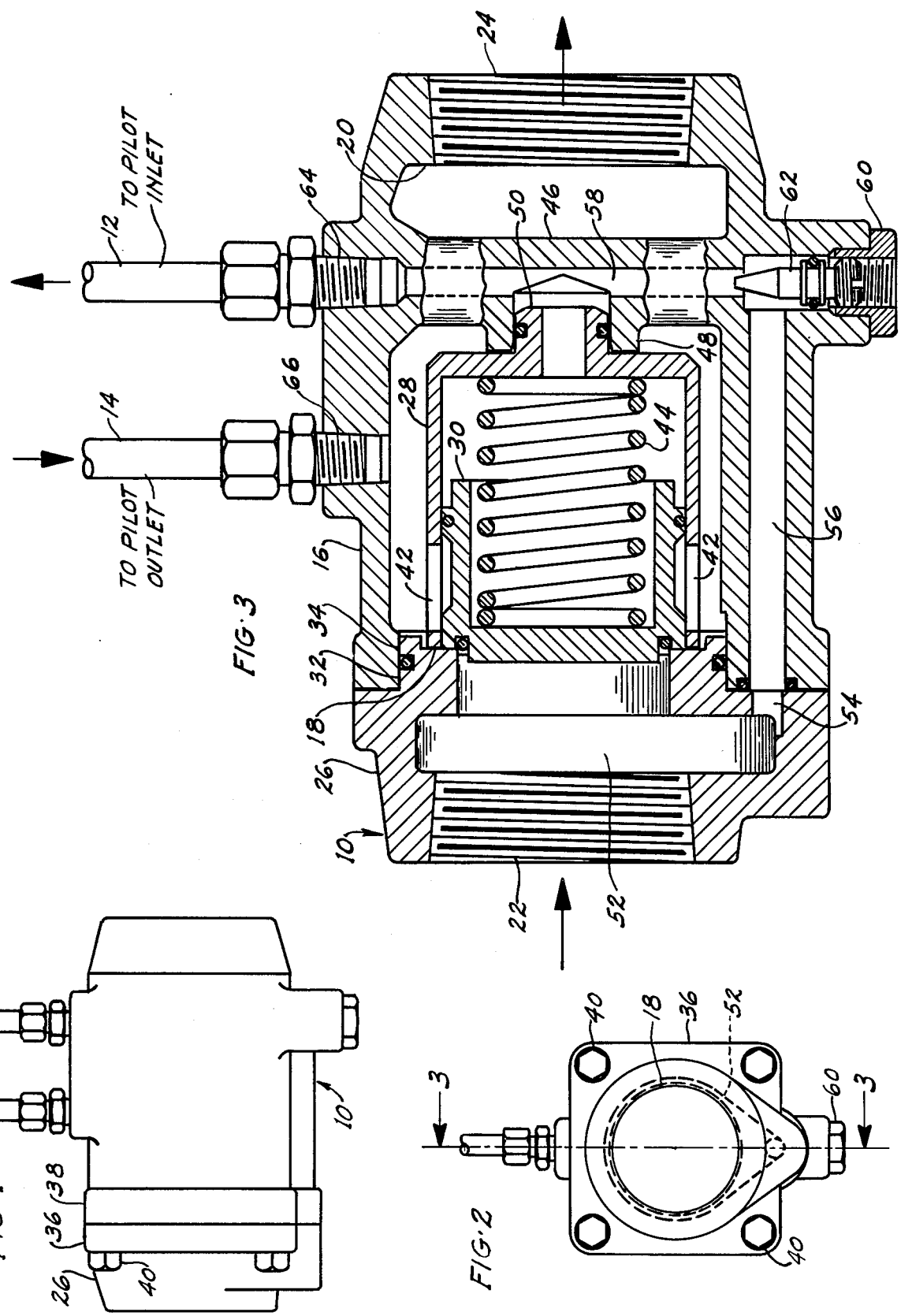

FLUID PRESSURE OPERATED VALVE

This application is a division of pending application Ser. No. 06/278,891 filed June 29, 1981, for Meter Controlled Dispensing Apparatus, now U.S. Pat. No. 4,418,839.

This invention relates to pilot valve controlled, fluid pressure operated valves of the type employed in meter controlled fluid dispensing apparatus and particularly to a more compact valve of this type having improved flow characteristics.

OBJECT OF THE INVENTION

An object of the invention is to provide a generally new and improved fluid pressure operated valve of compact construction having improved flow characteristics.

More specifically it is an object to provide a fluid operated valve with axially aligned inlet and outlet openings in which a valve element reciprocates on the axis of the inlet and outlet openings.

Further objects and advantages will appear when reading the following description in connection with the accompanying drawing.

IN THE DRAWING

FIG. 1, is a side elevational view of a fluid pressure operated valve constructed in accordance with the present invention;

FIG. 2, is an end elevational view of the valve shown in FIG. 1; and

FIG. 3, is an enlarged longitudinal sectional view of the valve shown in FIGS. 1 and 2 and is taken along line 3—3 of FIG. 2.

DESCRIPTION OF A PREFERRED FORM OF THE INVENTION

A fluid pressure operated valve constructed in accordance with the present invention and generally indicated at 10 is arranged to be connected to the inlet and outlet sides of a meter actuated pilot valve by tubing sections 12 and 14 respectively thereby to dispense therethrough a predetermined quantity of liquid. Valve 10 has a hollow cylindrical body 16 with inlet and outlet end walls 18 and 20 which have axially aligned and suitably screw threaded inlet and outlet passages 22 and 24 respectively therethrough.

The body 16 has an axially separable and detachably connected inlet section 26 embodying the inlet end wall 18 with inlet passageway 22 therein. The separable, detachably connected inlet section 26 permits the axial insertion into the valve body of a hollow cylindrical liner member 28 having a closed end and an open end and a hollow cylindrical valve element 30 having a closed end and an open end and arranged for sliding reciprocation in liner 28. The inlet section 26 has a short hollow cylindrical portion 32 fitted into a bore 34 in the main body portion and the inner end surface of portion 32 forms the inlet end wall 18. Inlet section 26 and the main body portion have meeting flanges 36 and 38 connected by cap screws 40.

The hollow cylindrical liner member 28 has its open end abutting the inlet wall 18 surrounding the inlet passage 22 and the hollow cylindrical valve element 30 has its closed end seated on the inlet end wall around the inlet passage 22 when closed. The outside diameter of hollow cylindrical liner 28 is smaller than the inside diameter of the hollow cylindrical valve body 16 and is provided with ports 42 in the side walls thereof adjacent its open end thereby to provide communication between the inlet and outlet passages when the valve element 30 is moved openward. A spring 44 biased between the closed ends of the liner 28 and valve element 30 biases the valve element 30 toward a closed position.

Extending diametrically across the hollow cylindrical valve body 16 adjacent the outlet end wall 20 is an integrally formed bar 46 having a laterally projecting hollow boss 48 which fittingly receives a hollow cylindrical boss 50 projecting outward from the closed end of liner member 28 thereby to fixedly mount the liner member 28 concentrically in the hollow cylindrical valve body 16.

Communication between inlet passageway 22 and the space between the closed ends of liner 28 and valve element 30 is provided by a generally annular groove 52 in the separable inlet section 26 and a connecting short longitudinal passage 54, a longitudinal passage 56 in a rib portion extending along one side of body 16, a connecting passage 58 extending longitudinally through the diametral extending bar 46 and the passages through the interfitting hollow bosses 48 and 50. The passage 58 extending longitudinally through bar 46 extends transversely completely through the valve body 16 and is screw threaded at one end to receive a hollow externally and internally threaded nut 60. The nut 60 screw threadedly receives an adjustable needle valve 62 for variably restricting the flow through passage 58.

At its other end passage 58 is counterbored and screw threaded at 64 to receive suitable connecting means for connecting that end of passage 58 via a tubing section 12 with the inlet of a pilot valve. There is also a similar bore and screw threaded counterbore 66 in the side wall of the valve body 16 for receiving suitable connecting means for connection, via a tubing section 14, of the outlet of the pilot valve with the outlet passage 24.

OPERATION

When fluid pressure operated valve 10 is connected in a line through which liquid tends to flow and the actuating pilot valve is completely closed so that there is no flow through connecting conduits 12 and 14 static upstreams pressure will be equally applied to both sides of the closed end of valve element 30 and the spring 44 will bias the valve closed so that no flow through valve 16 occurs.

When the pilot is moved openward so that there is flow through the connecting conduits 12 and 14 the inlet pressure on the outlet side of valve 30 will be diminished by exhaustion to the outlet passageway 24 and the valve 28 will move openward under inlet pressure applied to its inlet side.

I claim:

1. A fluid pressure operated valve device for connection to the inlet and outlet sides of a meter actuated pilot valve and for dispensing a predetermined quantity of liquid at rates determined by the meter; comprising a two part axially separable and detachably connected hollow cylindrical body having inlet and outlet end walls and axially aligned inlet and outlet passages therethrough, and a bar extending diametrically across said body and spaced from but adjacent said outlet end wall, a hollow cylindrical liner of smaller outside diameter than the inside diameter of said body arranged substantially concentrically in said body, said liner having a closed end and an open end with its closed end attached to said bar and its open end abutting said inlet end wall, and said liner having ports in the wall thereof adjacent its open end, a biased closed hollow cylindrical valve element arranged for slidable reciprocation in said liner and arranged to control said ports, said valve element having a closed end and an open end with its closed end facing said inlet passage, connecting passageway means in said body, said bar and said liner providing communication between said inlet passage and the interior of said liner, connecting passageway means in said liner and said bar providing communication between the interior of said liner and the exterior of said body, and connecting passageway means in said body providing communication between the exterior of said body and said outlet passage.

2. The fluid pressure operated valve device claimed in claim 1 in which means for attaching said closed end of said liner to said bar comprises a hollow boss projecting laterally from said bar fittingly receiving a boss projecting axially from the closed end of said liner and in which said passageway means providing communication between said inlet passage and the interior of said liner includes a passageway extending longitudinally through said bar and connecting passageways extending through said interfitting bosses.

3. The fluid pressure operated valve device claimed in claim 1 in which said passageway means providing communication between the interior of said liner and the exterior of said body includes connecting passageways extending longitudinally through said interfitting bosses and said bar.

4. The fluid pressure operated valve device claimed in claim 1 in which said passageway means providing communication between said inlet passageway and the interior of said liner includes means for variably restricting communication.

* * * * *